(12) United States Patent
Krabacher et al.

(10) Patent No.: US 8,169,599 B2
(45) Date of Patent: May 1, 2012

(54) DEVICE AND METHOD FOR MEASURING PARTS

(75) Inventors: Kenneth D. Krabacher, Xenia, OH (US); Leslie M Jenson, Blaine, MN (US)

(73) Assignee: Beta LaerMike, Inc., Dayton, OH (US)

( * ) Notice: Subject to any disclaimer, the term of this patent is extended or adjusted under 35 U.S.C. 154(b) by 267 days.

(21) Appl. No.: 12/499,535

(22) Filed: Jul. 8, 2009

(65) Prior Publication Data

US 2011/0007301 A1    Jan. 13, 2011

(51) Int. Cl.
*G01P 3/36* (2006.01)
*G01C 3/08* (2006.01)

(52) U.S. Cl. ........ 356/28.5; 356/28; 356/5.14; 356/4.09

(58) Field of Classification Search .............. 356/28, 356/28.5, 29, 24, 3.05, 5.14, 4.09, 3.04
See application file for complete search history.

(56) References Cited

U.S. PATENT DOCUMENTS

| | | | |
|---|---|---|---|
| 3,866,055 A | | 2/1975 | Pike |
| 4,537,503 A | * | 8/1985 | Liu ............................. 356/28.5 |
| 4,818,101 A | | 4/1989 | Soreide |
| 5,394,233 A | * | 2/1995 | Wang ......................... 356/5.01 |
| 5,748,295 A | * | 5/1998 | Farmer ....................... 356/5.09 |
| 5,900,975 A | * | 5/1999 | Sussman .................. 359/488.01 |
| 6,115,121 A | * | 9/2000 | Erskine ....................... 356/450 |
| 6,424,407 B1 | * | 7/2002 | Kinrot et al. ................... 356/28 |
| 6,624,883 B1 | * | 9/2003 | Zhou et al. ................. 356/237.1 |
| 6,741,335 B2 | * | 5/2004 | Kinrot et al. ................... 356/28 |
| 6,938,611 B2 | * | 9/2005 | Ismailov ....................... 123/494 |
| 7,423,736 B2 | * | 9/2008 | Baillon et al. .................. 356/28 |
| 2003/0142288 A1 | * | 7/2003 | Kinrot et al. ................... 356/28 |

* cited by examiner

*Primary Examiner* — Thomas Tarcza
*Assistant Examiner* — Antoine J Bedard
(74) *Attorney, Agent, or Firm* — R. William Graham

(57) ABSTRACT

A device and method for measuring moving material includes a processor and operating software associated therewith; a light source for emitting at least two polarized light beams in a manner wherein the beams cross thereby creating an interference region and generate a set of fringes; a sensor aligned relative to the interference region wherein the fringes have a predetermined orientation to the directional movement of the material and wherein the sensor is operably equipped to receive scattered light emanating from the interference region and provide a time varying signal to the processor such that the processor can manipulate and convert the signal to speed and distance and a polarizing filter operably associating a polarizing filter with one of the sensor and the emitting means in a manner to substantially preclude reflected polarized light from the interference region back to one of the sensor and the emitting source.

9 Claims, 3 Drawing Sheets

DEVICE AND METHOD FOR MEASURING PARTS

FIELD OF INVENTION

Figure 1:
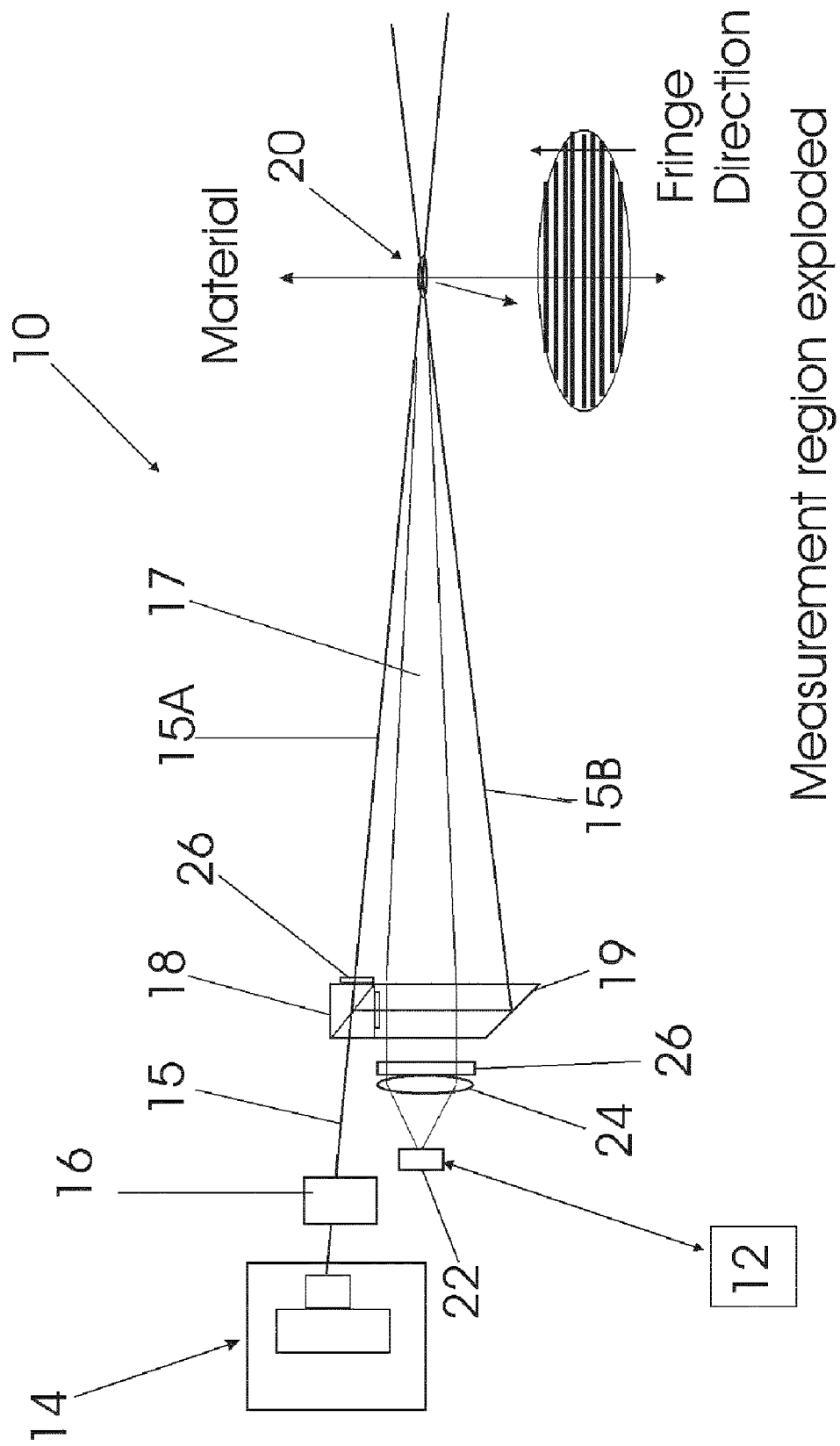

The present invention relates to improvements in devices and methods for measuring parts. More particularly, the invention relates to improvements in measuring moving parts to compensate for reflected and scattered light in the use of laser optics.

BACKGROUND OF THE INVENTION

There exist many Laser Doppler Velocimetry devices (LDV) (also known as laser Doppler anemometry, or LDA) to measure the speed and length of moving parts. These devices employ a technique for measuring the direction and speed of material that is processed.

The LDV crosses two beams of collimated, monochromatic, and coherent laser light in the flow of the material being measured. The two beams are usually obtained by splitting a single beam, thus ensuring coherency between the two and have the same polarity and exit the device at an angle. The two beams cross at some standoff distance from the device.

Where the beams cross (intersection) an interference pattern is created. At the beams intersection (the focal point of a laser beam), they interfere and generate a set of straight fringes.

A sensor is then aligned relative to the intersection such that the fringes are perpendicular to the directional movement of material. As material pass through the fringes, they reflect light (only from the regions of constructive interference) into a photodetector (typically an avalanche photodiode), and since the fringe spacing d is known (from calibration), the velocity can be calculated to be u=f×d where f is the frequency of the signal received at the detector.

Since the beam angle is fixed and the wavelength is constant, the distance between the fringes is known and is constant. As particles on the measurement surface move through this interference pattern, a time varying signal is created and measured by the device and converted to speed and distance. It is the light that scatters off of the light stripes of the fringe pattern that generates the signal. This signal is received by the APD (Avalanche Photo Diode).

The particles must be big enough to scatter sufficient light for signal detection (good signal to noise ratio) but small enough to follow the flow. By analyzing the Doppler-equivalent frequency of the laser light scattered (intensity modulations within the crossed-beam probe volume) by the particles within the movement, the local velocity of the material can be determined. The area of interest within the material field is sampled by a crossed-beam in a point by point manner.

While the above system works well on many surfaces, problems can arise when the surface is smooth and shiny. As the surface gets shinier the ratio of reflected light to scattered light increases. The speed information is only in the scattered light. As the reflected light increases, the APD gain decreases. It can decrease to the point where the scattered light can no longer be detected. In extreme cases, the APD can actually saturate due to too much light. In both of these cases, there is no measurement.

Another effect of too much reflected light is that light can feed back into the laser diode and cause it to mode hop. A mode hop is a wavelength change which affects the measurement accuracy. The diode can even get into a state where it is constantly mode hopping and this can result in no measurement.

SUMMARY OF INVENTION

It is an object to improve measurement of moving parts.
It is another object to improve devices that measure moving parts.
It is yet a further object to provide an improved device and method for accurately measuring moving material with enhanced scattered light detection.
It is another object to minimize negative effects from reflective light in Laser Doppler Velocimetry.

Accordingly, the instant invention is directed to a device for measuring moving material, which includes:
a processor and operating software associated therewith;
means for emitting at least two polarized light beams in a manner wherein the beams cross thereby creating an interference region and generate a set of fringes;
a sensor aligned relative to the interference region wherein the fringes have a predetermined orientation to the directional movement of the material and wherein the sensor is operably equipped to receive scattered light emanating from the interference region and to provide a time varying signal to the processor such that the processor can manipulate and convert to speed and distance; and
a polarizing filter operably disposed between the sensor and or emitting means and the interference region.

A method of measuring moving material, includes the steps of providing a processor and operating software associated therewith; providing a source for emitting at least two polarized light beams in a manner wherein the beams cross thereby creating an interference region and generate a set of fringes; operably disposing a sensor aligned relative to the interference region wherein the fringes have a predetermined orientation to the directional movement of the material and the sensor receives scattered light emanating from the interference region and providing a time varying signal to the processor such that the processor can manipulate and convert to speed and distance; and operably associating a polarizing filter with one of the sensor and the emitting means in a manner to substantially preclude reflected polarized light from the interference region back to one of the sensor and emitting means.

BRIEF DESCRIPTION OF THE DRAWINGS 2

Figure 2:
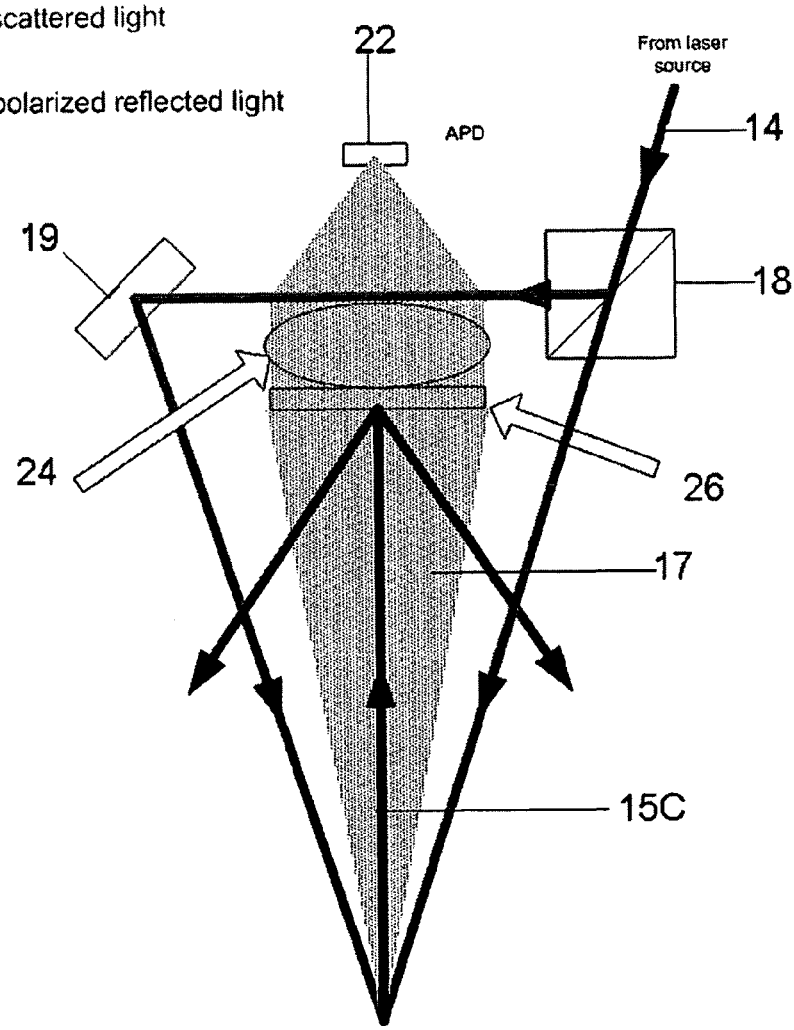
Figure 3:
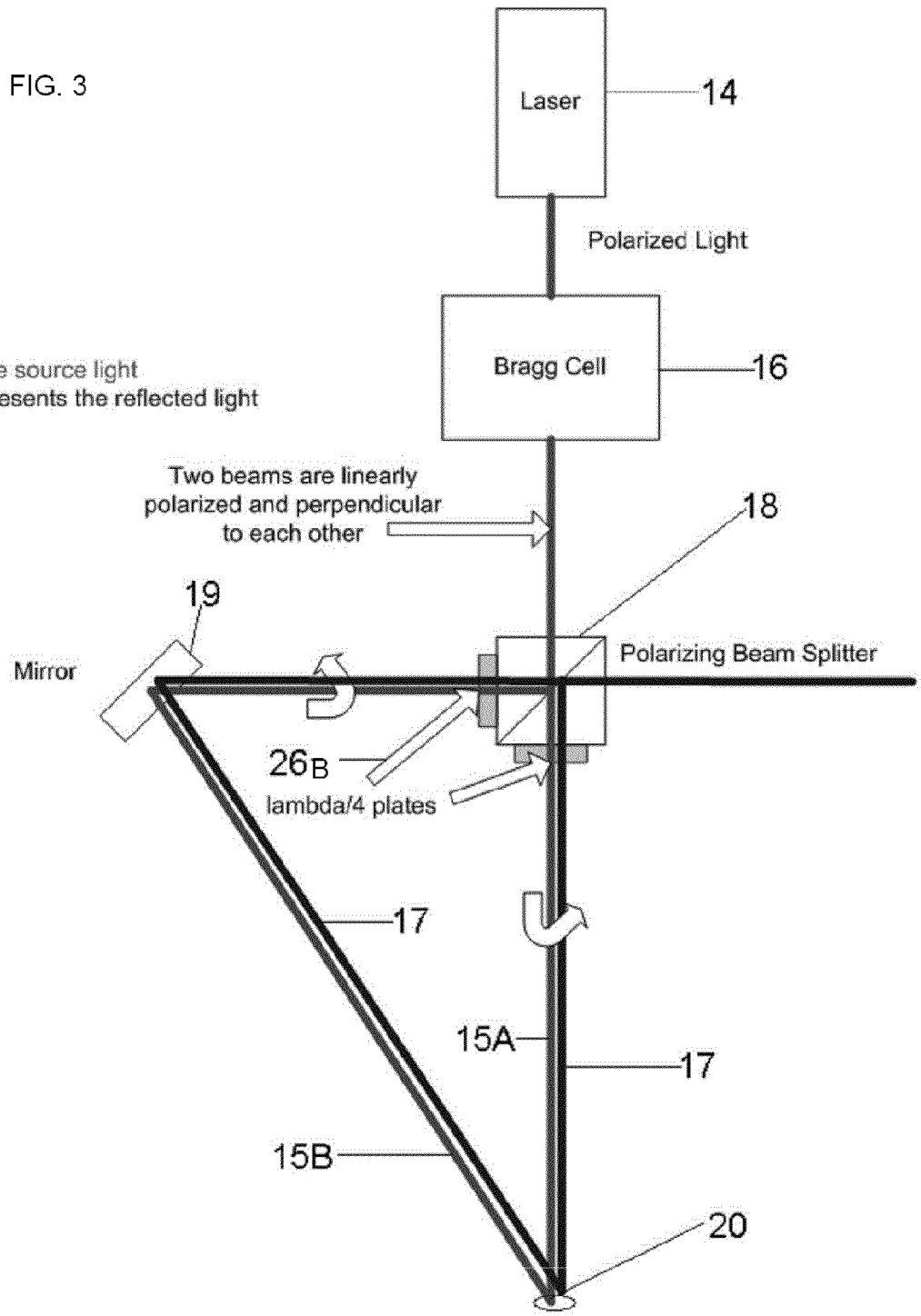

FIG. 1 depicts a schematic of the invention.
FIG. 2 depicts a schematic of a part of the invention for one embodiment.
FIG. 3 depicts a schematic of a part of the invention for another embodiment.

DETAILED DESCRIPTION OF PREFERRED EMBODIMENTS

Referring now to the drawings, the device for measuring moving material of the instant invention is generally designated by the numeral 10. The device 10 can include a processor unit 12 having operating software, hardware and display readout, and operative key board associated therewith. A laser diode 14 can be employed for emitting a light beam 15 which can preferably be passed through an acousto-optical modulator 16 acousto-optic modulator (AOM), also called a Bragg cell, which uses the acousto-optic effect to diffract and shift the frequency of light using sound waves (usually at radio-frequency). The light beam 15 can then be passed through an optical beam splitter 18 to provide two light beams 15A, 15B having the same polarity. The light beams 15A and 15B exit the beam splitter 18 in a non parallel manner wherein the light beams 15A and 15B cross thereby creating an interference region 20 and generating a set of fringes. This can also be referred to as the measurement region 20.

A sensor 22 (such as an Avalanche Photo Diode) can be aligned relative to the interference region 20 wherein the fringes have a predetermined orientation to the directional movement of the material. The sensor 22 is operably equipped to receive scattered light emanating from the interference region 20 and to provide a time varying signal to the processor 12 such that the processor 12 can manipulate the signal and convert the signal to speed and distance. A receiving lens 24 is operably disposed between the sensor 22 and the interference region 20 and a polarizing filter 26 can be operably disposed between the interference region 20 and the receiving lens 24.

As depicted in FIG. 2, the reflected polarized light 15C does not pass back through the polarizing filter 26. The scattered light 17 which is the light that scatters off of the light stripes of the fringe pattern of region 20 passes through the receiving lens 24 which in turn is received by the sensor 22.

To reiterate, issues can arise when the material surface is smooth and shiny. As the surface gets shinier, the ratio of reflected light 15C to scattered light 17 increases. The speed information is only in the scattered light. As the reflected light 15C increases, the sensor 22 gain traditionally decreases to the point where the scattered light 17 can no longer be detected and the sensor 22 can actually saturate due to too much light.

To keep the sensor 22 from saturating and to keep light from feeding back to the laser diode 14, optics can be used to block reflected light 15C from entering either the sensor 22 or the laser diode 14. To keep reflected light 15C from entering the sensor 22, polarizing filter 26 can be employed between the sensor 22 and interference region 20. Since light coming from the laser diode 14 is relatively well polarized, the reflected light 15C off the measurement surface stays relatively well polarized. The polarized filter 26, which can either be a linear polarizer or a combination of circular and linear polarizers, is oriented in such a way to block the reflected, polarized light 15C. The scattered light 17 which comes off the measurement surface is randomly polarized and therefore it can pass through the polarizing filter 26. The scattered light 17 is attenuated, but enough passes through to get a measurement. In this regard, the sensor 22 can receive the scattered light 17 and send a signal to the processor unit 12 and convert the signal to speed and distance data.

To keep reflected light from entering the laser diode 14, circular polarizers can be added to the source path of the laser diode 14. A key to this principle is that the polarizing beam splitter 18, already in the system, is used to keep light from going back down the same path back into the diode.

This effect is used in the construction of instant invention which permits light to initially pass through an optical isolator (e.g., receiving lens 24 with polarized filter 26 and polarized beam splitter 18) but prevent such light, when reflected, from returning through the optical isolator back to the light source. Since the light is circularly polarized, when it reflects off of the surface and goes back through the circular polarizers ($\lambda/4$ plates) 26B associated with the beam splitter 18 and mirror 19 in the opposite direction as seen in FIG. 3, it becomes linearly polarized perpendicular to the source. When it passes through the beam splitter 18, instead of being directed toward the laser diode 14, it is reflected away from the laser diode 14.

By so providing, the improvements in the art are found to significantly enhance the performance of Laser Doppler Velocimetry when the material being measured is shiny. In field applications where it was previously impossible to get accurate measurements, these two improvements have allowed the Laser Doppler Velocimetry to measure accurately as it does on non-shiny surfaces.

While the present invention has been set forth above in a preferred embodiment, it is contemplated that other modifications, improvements and derivations will be readily apparent to those skilled in the art. Accordingly, the appended claims hereto should be accorded the full scope of protection of any such modifications, improvements and derivations.

What is claimed is:

1. A device for measuring moving material, which includes:
   a processor and operating software associated therewith;
   light source means for emitting at least two polarized light beams in a manner wherein said beams cross thereby creating an interference region and generate a set of fringes;
   a sensor aligned relative to said interference region wherein the fringes have a predetermined orientation to the directional movement of the material and wherein the
   sensor is operably equipped to receive scattered light emanating from said interference region and provide a time varying signal to said processor such that said processor can manipulate and convert said signal to speed and distance; and
   an optical isolator having circular polarizers and a polarized beam splitter operably associated with said sensor in a manner to substantially preclude reflected polarized light from said interference region back to said sensor and configured to let light pass through the optical isolator and prevent such light, when reflected, from returning through said optical isolator back to the light source means such that the light is circularly polarized when reflecting off a surface changing direction and goes back through one of said circular polarizers in an opposite direction and becomes linearly polarized perpendicular to said emitted light beams.

2. The device for measuring moving material of claim 1, which includes a receiving lens operably disposed between said sensor and said optical isolator.

3. The device for measuring moving material of claim 1, wherein said emitting light source means includes a light emitting diode.

4. A device for measuring moving material, which includes:
   a processor and operating software associated therewith;
   light source means for emitting at least two polarized light beams in a manner wherein said beams cross thereby creating an interference region and generate a set of fringes;
   a sensor aligned relative to the interference region wherein said fringes have a predetermined orientation to the directional movement of the material and wherein said sensor is operably equipped to receive scattered light emanating from said interference region and provide a time varying signal to said processor such that said processor can manipulate and convert said signal to speed and distance; and an optical isolator having circular polarizers and a polarized beam splitter operably associating a polarizing filter with said emitting light source means in a manner to substantially preclude reflected polarized light from said interference region back to said emitting light source means and configured to let light pass through said optical isolator and prevent such light, when reflected, from returning through the optical isolator back to the light source such that the light is circularly polarized when reflecting off a surface changing direction and goes back through one of said circular polarizers in an opposite direction and becomes linearly polarized perpendicular to said emitted light beams.

5. The device for measuring moving material of claim 4, which includes a receiving lens operably disposed between said sensor and said optical isolator.

6. The device for measuring moving material of claim 1, wherein said emitting light source means includes a light emitting diode.

7. A method of measuring moving material, which includes the steps of:
(a) providing a processor and operating software associated therewith;
(b) providing a light source source for emitting at least two polarized light beams in a manner wherein the beams cross thereby creating an interference region and generating a set of fringes;
(c) operably disposing a sensor aligned relative to the interference region wherein the fringes have a predetermined orientation to the directional movement of the material and the sensor receives scattered light emanating from said interference region and provides a time varying signal to said processor such that said processor can manipulate and convert said signal to speed and distance; and
(d) operably associating an optical isolator having circular polarizers and a polarized beam splitter with one of said sensor and said emitting light source means in a manner to substantially preclude reflected polarized light from said interference region back to one of said sensor and emitting light source means and configured to let light pass through said optical isolator and prevent such light, when reflected, from returning through the optical isolator back to the light source such that the light is circularly polarized when reflecting off a surface changing direction and goes back through said one of said circular polarizers in an opposite direction and becomes linearly polarized perpendicular to said emitted light beams.

8. The method of measuring moving material of claim 7, which includes providing a receiving lens operably disposed between said sensor and said optical isolator.

9. The method of measuring moving material of claim 7, wherein said emitting light source means includes a light emitting diode.

* * * * *